E. J. GARDNER.
SAFETY ATTACHMENT.
APPLICATION FILED SEPT. 5, 1918.

1,312,843.

Patented Aug. 12, 1919.
2 SHEETS—SHEET 1.

Witness
Inventor,
E. J. Gardner
By C. A. Snow & Co.
Attorneys.

E. J. GARDNER.
SAFETY ATTACHMENT.
APPLICATION FILED SEPT. 5, 1918.

1,312,843.

Patented Aug. 12, 1919.
2 SHEETS—SHEET 2.

E. J. Gardner
Inventor,

Witness

By Attorneys.

UNITED STATES PATENT OFFICE.

EDMOND J. GARDNER, OF VALLIANT, OKLAHOMA.

SAFETY ATTACHMENT.

1,312,843.  Specification of Letters Patent.  Patented Aug. 12, 1919.

Application filed September 5, 1918. Serial No. 252,740.

*To all whom it may concern:*

Be it known that I, EDMOND J. GARDNER, a citizen of the United States, residing at Valliant, in the county of McCurtain and State of Oklahoma, have invented a new and useful Safety Attachment, of which the following is a specification.

The subject of this invention is a safety attachment for the steering gear of an automobile or the like.

The main object of the invention is the provision of means for relieving the steering wheel from shock due to the vehicle wheels meeting obstacles in the road.

Another object of the invention is the provision of means for moving the steering rod through the steering wheel and shaft, and locking it against motion when power is applied thereto through other sources.

Another object of the invention is the provision of means for clamping the steering rod to a rigid part of the vehicle, and releasing the clamp.

The invention also contemplates generally improving the construction and enhancing the utility of attachments of this character.

With the foregoing and other objects in view, which will appear as the description proceeds, the invention resides in the combination and arrangment of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawings, wherein:—

Figure 1:
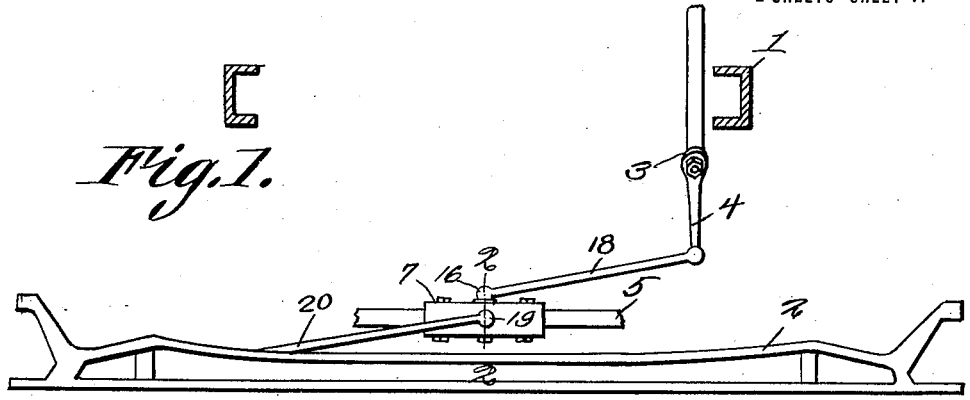
Figure 1 is a view in front elevation of the device, a portion of an automobile to which it is shown applied being shown.
Figure 2:
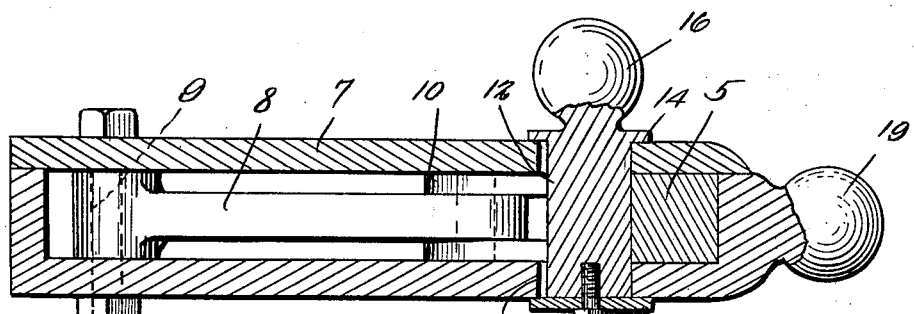
Fig. 2 is a sectional view taken on the line 2—2 of Fig. 1.
Figure 3:
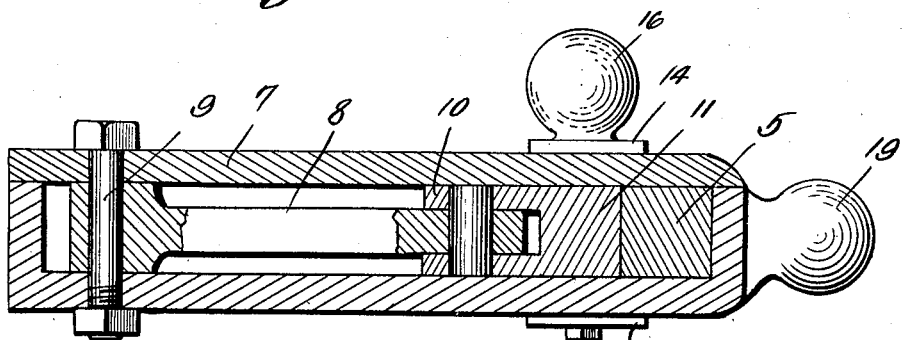
Fig. 3 is a sectional view taken on the line 3—3 of Fig. 4.
Figure 4:
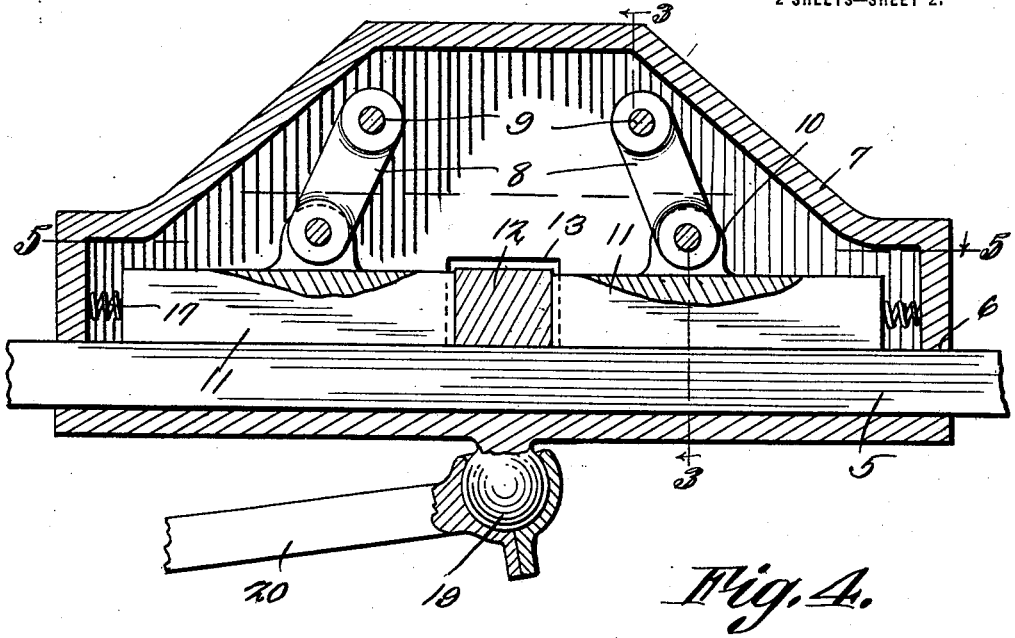
Fig. 4 is a central horizontal section.
Figure 5:
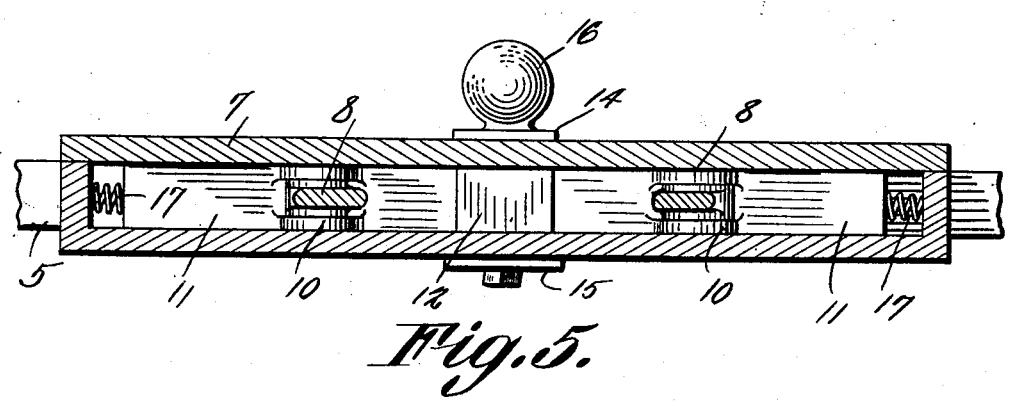
Fig. 5 is a section on the line 5—5 of Fig. 4.

Referring to the drawings by numerals of reference:—

A portion of the frame of an automobile is indicated at 1, and the front axle thereof is shown at 2. The automobile is provided with the usual steering shaft or column 3, to the lower end of which is secured a crank 4, terminating in the usual spherical end.

A horizontally disposed rod 5, of angular cross section, is secured in any suitable manner (not shown) to the frame work of the automobile, and this rod passes with a sliding fit through apertures 6 formed in the ends of a casing 7. A pair of links 8 are mounted within the casing 7, and ends of these links are pivotally secured by the pins or bolts 9, while the other ends of the links have pivotal engagement between ears 10 formed on blocks or clamps 11, 11.

The blocks 11 extend longitudinally of the bar 5, with those faces of the block remote from the faces from which the ears 10 extend engaging the bar 5. A release block 12 extends through an aperture 13 formed in the casing 7, and this block is interposed between the opposed or adjacent ends of the blocks 11. The aperture 13 is of sufficient extent to allow the release block 12 a slight movement therein. A flange 14 is formed at the upper end of the release block 12 for the purpose of properly retaining the block in place, while a flange 15 may be detachably secured to its lower end so that the release block may be readily placed in position in the aperture and then secured against accidental removal therefrom.

A spherical projection 16 is provided on the upper end of the release block 12 to pivotally engage one end of a link 18, the other end of which engages the spherical end of the crank 4, so that movement of the crank through rocking of the steering column will cause a movement of the release block 12.

Compression springs 17 are positioned within the casing 7 and are confined between the end walls of the casing and the remote ends of the blocks 11, and serve to force the blocks 11 toward the release block 12.

A boss 19 is formed on the front edge of the casing 7 and enters the socket formed at one end of the steering rod 20 to pivotally connect the casing and the rod.

The operation is as follows:—When the steering shaft or column 3 is rocked, and with it the crank 4, the link 18 is moved which causes a slight movement of the block 12. This slight initial movement of the release block 12 will cause the block to strike against the adjacent end of one of the blocks 11 which will move the block against the force of the spring 17 and will, through the swing of the link 8, release the block from pressure against the rod or bar 5. This will allow the casing 7 to be moved by further movement of the link 18 and release block 12. Movement of the casing 7 will be imparted, through the steering rod 20, to the wheels of the vehicle.

Should a force be applied to the casing tending to move it longitudinally of the bar 5, other than a force acting through the release block 12, the block 11 situated at that end toward which the force was tending to move the casing, would, through the link 8, be forced against the bar 5 and lock the casing firmly against movement.

Having thus described the invention, what is claimed as new and sought by Letters Patent, is:—

In a device of the class described, a fixed rod; a casing slidable longitudinally of the rod; a releasing member having limited movement in the casing longitudinally of the rod; clamps in the casing and bearing against one side of the rod, the inner ends of the clamps coöperating with the releasing member; spring means for forcing the clamps longitudinally toward the releasing member and transversely into engagement with the rod; converging links having their ends pivoted, respectively, to the clamps and to the casing; means for connecting the releasing member with a steering element under the control of an operator; and means for connecting the casing with a driven element of the mechanism to be shifted in steering.

In testimony that I claim the foregoing as my own, I have hereto affixed my signature in the presence of two witnesses.

EDMOND J. GARDNER.

Witnesses:
S. V. HACKWORTH,
W. D. MARCHBANKS.

Copies of this patent may be obtained for five cents each, by addressing the "Commissioner of Patents, Washington, D. C."